(12) United States Patent
Onuki

(10) Patent No.: US 11,713,976 B2
(45) Date of Patent: *Aug. 1, 2023

(54) GUIDANCE SYSTEM

(71) Applicant: NEC Corporation, Tokyo (JP)

(72) Inventor: Hirohisa Onuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/686,605

(22) Filed: Mar. 4, 2022

(65) Prior Publication Data

US 2022/0187097 A1  Jun. 16, 2022

Related U.S. Application Data

(63) Continuation of application No. 16/606,300, filed as application No. PCT/JP2018/015447 on Apr. 12, 2018, now Pat. No. 11,307,046.

(30) Foreign Application Priority Data

Apr. 26, 2017 (JP) ................................. 2017-087305

(51) Int. Cl.
*G01C 21/36* (2006.01)
*G06F 16/9038* (2019.01)
(Continued)

(52) U.S. Cl.
CPC ..... *G01C 21/3647* (2013.01); *G01C 21/3438* (2013.01); *G01C 21/3453* (2013.01);
(Continued)

(58) Field of Classification Search
CPC ............ G01C 21/3617; G01C 21/3438; G01C 21/3453; G06F 16/9035
See application file for complete search history.

(56) References Cited

U.S. PATENT DOCUMENTS

2013/0090849 A1  4/2013  Uetake
2013/0103306 A1  4/2013  Uetake
(Continued)

FOREIGN PATENT DOCUMENTS

JP  2000-067163 A   3/2000
JP  2000067163 A *  3/2000  ............... G06K 9/62
(Continued)

OTHER PUBLICATIONS

English Translation of JP-2014032615-A1.*
(Continued)

*Primary Examiner* — Rami Khatib
*Assistant Examiner* — Gabriel Joseph Rene Lambert
(74) *Attorney, Agent, or Firm* — Sughrue Mion, PLLC

(57) ABSTRACT

This guidance system is provided with: an accepting unit which acquires a guidance request including at least a destination and image data from a user terminal; a guidance unit which, on the basis of vehicle information of a vehicle recognized from the image data by image recognition, acquires vehicle related information relating to said vehicle, and with reference to the vehicle related information and the destination, derives a ride suitability indicating whether the vehicle is suitable for traveling to the destination; and a response unit which reports a response including at least the ride suitability derived by the guiding unit to the user terminal.

20 Claims, 12 Drawing Sheets

(51) Int. Cl.
  *G06F 16/9035* (2019.01)
  *G01C 21/34* (2006.01)

(52) U.S. Cl.
  CPC ..... *G01C 21/3617* (2013.01); *G06F 16/9035* (2019.01); *G06F 16/9038* (2019.01)

(56) References Cited

U.S. PATENT DOCUMENTS

| | | |
|---|---|---|
| 2014/0267399 A1 | 9/2014 | Zamer |
| 2015/0016715 A1 | 1/2015 | Isago et al. |
| 2020/0072632 A1* | 3/2020 | White .................. G06V 20/58 |

FOREIGN PATENT DOCUMENTS

| | | | |
|---|---|---|---|
| JP | 2004-213509 A | 7/2004 | |
| JP | 2008-242538 A | 10/2008 | |
| JP | 2014-032615 A | 2/2014 | |
| JP | 2014032615 A * | 2/2014 | ............ H04M 11/00 |
| WO | 2011/158336 A1 | 12/2011 | |

OTHER PUBLICATIONS

English Translation of JP-2000067163-A.*
JP-2014032615-A English Translation.*
International Search Report for PCT Application No. PCT/JP2018/015447, dated Jul. 17, 2018.
English translation of Written opinion for PCT Application No. PCT/JP2018/015447, dated Jul. 17, 2018.
Australian Office Action for AU Application No. 2018260150 dated May 18, 2020.
Japanese Office Action for JP Application No. 2020-167415 dated Jul. 21, 2021 with English Translation.

* cited by examiner

INFORMATION COLLECTION PATTERN TABLE

| INFORMATION COLLECTION PATTERN | LOCATION | TYPE | COMPANY | SERVICE LINE | VEHICLE-SPECIFIC NUMBER | ACCEPTED PAYMENT METHODS | ... |
|---|---|---|---|---|---|---|---|
| PATTERN A | ○ | ○ | ○ | ○ | ○ | ○ | ... |
| PATTERN B | ○ | ○ | ○ | ○ | — | — | ... |
| PATTERN C | ○ | ○ | ○ | — | ○ | ○ | ... |
| ... | ... | ... | ... | ... | ... | ... | ... |

FIG. 5

GUIDANCE REQUEST/VEHICLE-
RELATED INFORMATION TABLE

| GUIDANCE REQUEST NUMBER | TYPE | COMPANY | SERVICE LINE | VEHICLE-SPECIFIC NUMBER | ACCEPTED PAYMENT METHODS | TIME TABLE | | INTENDED ALIGHTING LOCATION POSITION | TARGET LANDMARK | REQUIRED WALKING TIME |
|---|---|---|---|---|---|---|---|---|---|---|
| | | | | | | STOP TIME | ALIGHTING LOCATION | | | |
| 0001 (PATTERN A) | BUS | COMPANY A | SERVICE LINE A | 003 | ... | ... | ... | ... | ... | ... |
| 0002 (PATTERN B) | TRAIN | COMPANY B | ... | — | — | ... | ... | ... | ... | ... |
| ... | ... | ... | ... | ... | ... | ... | ... | ... | ... | ... |

FIG. 6

INFORMATION DATABASE EXAMPLE 1 PROVIDING VARIOUS TYPES OF INFORMATION

| VEHICLE | COMPANY | SERVICE LINE | VEHICLE-SPECIFIC NUMBER | VEHICLE CURRENT POSITION | ACCEPTED PAYMENT METHODS | TIMETABLE | | |
|---|---|---|---|---|---|---|---|---|
| | | | | | | STOP TIME | DEPARTURE TIME | ALIGHTING LOCATION |
| ... | ... | ... | ... | ... | ... | ... | ... | ... |
| ... | ... | ... | ... | ... | ... | ... | ... | ... |
| ... | ... | ... | ... | ... | ... | ... | ... | ... |

INFORMATION DATABASE EXAMPLE 2 PROVIDING VARIOUS TYPES OF INFORMATION

| ALIGHTING LOCATION | INTENDED DESTINATION (LANDMARK, EVENT VENUE, etc.) | REQUIRED WALKING TIME |
|---|---|---|
| ... | ... | ... |
| ... | ... | ... |
| ... | ... | ... |

| INFORMATION DATABASE EXAMPLE 3 PROVIDING VARIOUS TYPES OF INFORMATION | | | |
|---|---|---|---|
| POSITION | SERVICE LINE | ALIGHTING LOCATION (UP) | ALIGHTING LOCATION (DOWN) |
| ... | ... | ... | ... |
| ... | ... | ... | ... |
| ... | ... | ... | ... |

FIG. 9

GUIDANCE SYSTEM

The present application is a Continuation application of Ser. No. 16/606,300 filed on Oct. 18, 2019, which is a National Stage Entry of PCT/JP2018/015447 filed on Apr. 12, 2018, which claims priority from Japanese Patent Application 2017-087305 filed on Apr. 26, 2017, the contents of all of which are incorporated herein by reference, in their entirety.

TECHNICAL FIELD

This invention relates to a guidance system configured to provide a user terminal with guidance for assisting a user in traveling.

BACKGROUND ART

In recent years, various services have been provided to users by using a cloud platform or the like. Each user uses various services in accordance with his or her preference. In many cases, a service system relating to route search related to this invention is configured by a user terminal connected to a network and a server on the network.

A system relating to route search is described in Patent Document 1, for example. In Patent Document 1, there is disclosed a route guidance system including a map data database configured to store map data that includes a large number of pieces of name information indicating a name of each location (station name and building name, for example), and a guidance information database configured to store guidance information on each location. In the second embodiment of Patent Document 1, there is described a route guidance system (server) including image recognition means. The route guidance system receives via a network an image of a map photographed by a user terminal, performs image analysis on the image of the map, and identifies map data matching the drawn map content. The route guidance system (server-terminal) is also configured so that each piece of name information in the identified map data is presented to the user in a selectable manner, and a selected piece of name information can be set as a navigation "departure point" or "intended destination". With the use of this function, it is possible to present route guidance from a "current location" acquired by the Global Positioning System (GPS), for example, to an "intended destination" selected by the user, and guidance information associated with each piece of name information. In Patent Document 1, there is also disclosed an external device (external server) that is accessed in order to update the map data (database) and the like in a timely manner.

PRIOR ART DOCUMENTS

Patent Document

Patent Document 1: WO 2011/158336 A1

SUMMARY OF THE INVENTION

Problem to be Solved by the Invention

The inventor of this invention investigated functions capable of cooperating with a route search system from a new viewpoint. Regarding the use of a vehicle, for example, public transportation means, the inventor of this invention considered providing a single piece of highly convenient information to people who are unfamiliar with their current locations, for example, foreign tourists.

It is conceivable that many people tend to become anxious about getting on and off the vehicle that they have never been on or have been on only a few times at a place they are not acquainted with. In view of such anxiety, even when a vehicle such as a bus or a train is right in front of the person at the time of getting on and off the vehicle, the person is likely to be worried about whether or not that vehicle will actually stop at the intended location. As another related factor causing anxiety, the person may not know usage rules such as how to use the vehicle or how to pay the fare for the vehicle.

Existing route search systems do not solve the above-mentioned problem of user anxiety even when, for example, the route search system provides guidance to a bus stop and presents the time at which the bus is to arrive (time in the timetable), the time required to reach the intended destination, and the arrival time. Even in the route search system disclosed in Patent Document 1 described above as an example, the above-mentioned problem of user anxiety is not solved.

This invention has been made in view of the matters described above, and this invention provides a guidance system capable of reducing some of the anxiety factors of a user using vehicle.

Means to Solve the Problem

A guidance system according to one embodiment of this invention comprises a reception unit configured to acquire from a user terminal a guidance request including at least an intended destination and image data; a guidance unit configured to recognize vehicle information on a vehicle from the image data by image recognition, to acquire vehicle-related information on the vehicle based on the vehicle information on the vehicle, and to derive a ride suitability indicating whether or not the vehicle is suitable for reaching the intended destination by referring to the vehicle-related information and the intended destination; and a response unit configured to notify the user terminal of a response including at least the ride suitability derived by the guidance unit.

A guidance method to be performed by an information processing system according to one embodiment of this invention comprises receiving, from a user terminal, a guidance request including at least an intended destination and image data; performing image recognition on vehicle information on a vehicle appearing in the image data, and acquiring vehicle-related information on the vehicle based on the vehicle information recognized by image recognition; deriving a ride suitability indicating whether or not the vehicle is suitable for reaching the intended destination by referring to the vehicle-related information and the intended destination; and notifying the user terminal of a response including at least the derived ride suitability.

A program according to one embodiment of this invention is adapted to cause a server system to operate as a reception unit configured to acquire from a user terminal a guidance request including at least an intended destination and image data; a guidance unit configured to recognize vehicle information on a vehicle from the image data by image recognition, to acquire vehicle-related information on the vehicle based on the vehicle information on the vehicle, and to derive a ride suitability indicating whether or not the vehicle is suitable for reaching the intended destination by referring to the vehicle-related information and the intended destination; and a response unit configured to notify the user terminal of a response including at least the ride suitability derived by the guidance unit.

A computer-readable non-transitory recording medium according to one embodiment of this invention has the above-mentioned program recorded thereon and is adapted to cause a server system to operate as a guidance system.

Effect of the Invention

According to this invention, it is possible to provide the guidance system capable of reducing some of the anxiety factors of the user using the vehicle.

BRIEF DESCRIPTION OF THE DRAWING

FIG. 5 is an explanatory diagram for showing an information collection pattern table to be used by the guidance derivation unit 13 in a visual manner.

FIG. 6 is an explanatory diagram for showing a guidance request/vehicle-related information table to be used by the guidance derivation unit 13 in a visual manner.

FIG. 7 is an explanatory diagram for showing an information database 1 to serve as an acquisition source of vehicle-related information.

FIG. 8 is an explanatory diagram for showing an information database 2 to serve as the acquisition source of vehicle-related information.

FIG. 9 is an explanatory diagram for showing an information database 3 to serve as the acquisition source of vehicle-related information.

MODE FOR EMBODYING THE INVENTION

Now, a description is given of an embodiment of this invention referring to the accompanying drawings.

Embodiment

Figure 1:
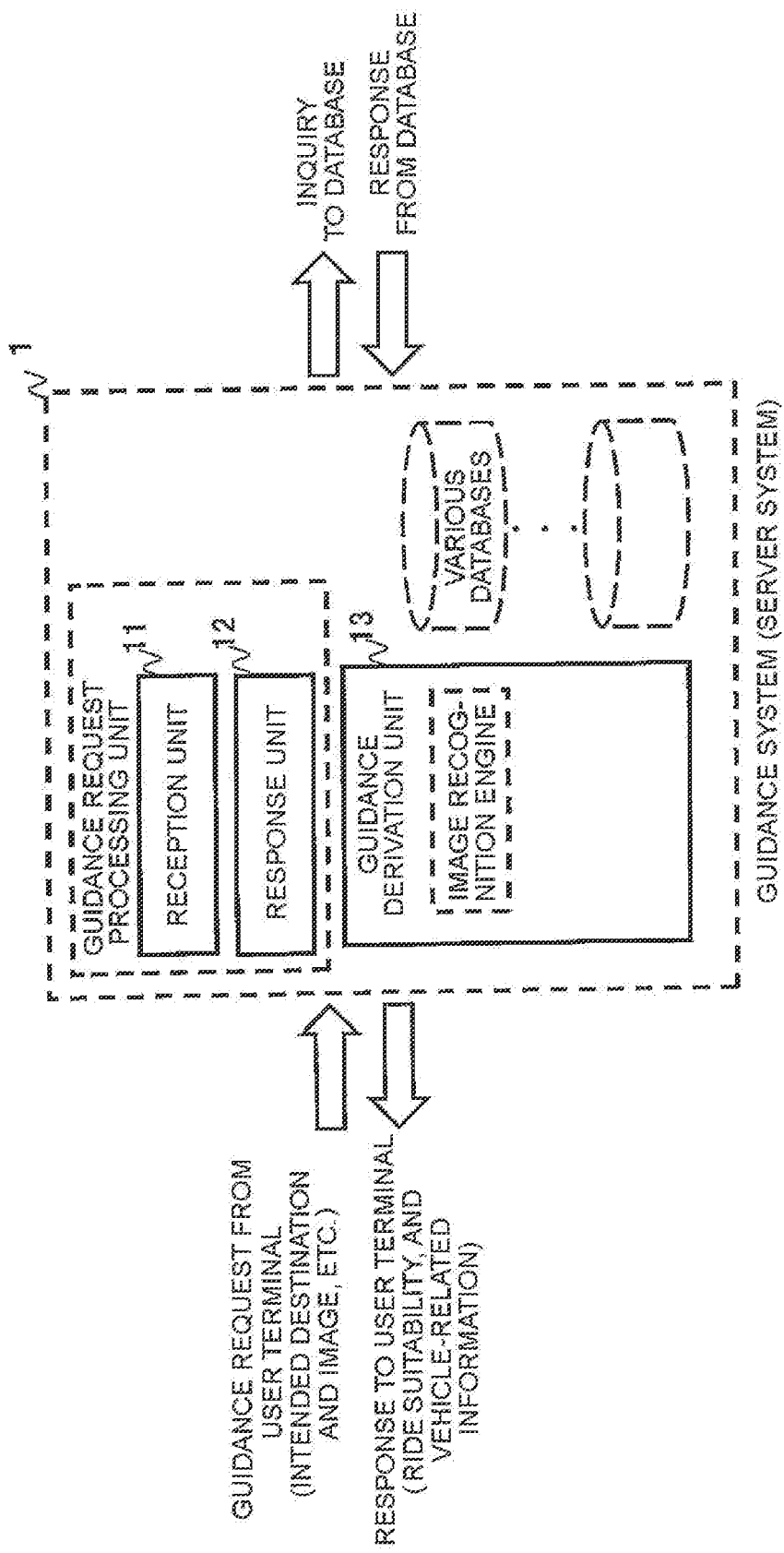
FIG. 1 is a block diagram for illustrating a guidance system 1 according to an embodiment of this invention.

FIG. 1 is a block diagram for illustrating a guidance system 1 according to an embodiment of this invention.

The guidance system 1 includes a reception unit 11 configured to receive a guidance request from a user terminal, a response unit 12 configured to notify a response to the guidance request to the user terminal, and a guidance derivation unit 13 configured to derive guidance contents.

The guidance system 1 and the user terminal are connected to each other by general communication means. The connection mode is not particularly limited, and the connection may be established via a communication network such as mobile communication, Wi-Fi (registered trademark), or Bluetooth (registered trademark).

The guidance system 1 is configured so that various databases are usable, as described later. The guidance system 1 may be configured to operate in cooperation with an external database as required. The various databases are configured to store various pieces of information (vehicle-related information to be described later) that are to serve as the basis of vehicle guidance to be presented to the user, comparison data to be used by an image recognition engine, and the like. It is desired that the guidance system 1 include a system configured to appropriately acquire various pieces of information from various systems and databases that are able to cooperate with the guidance system 1, and to update the various pieces of information to the latest information as appropriate.

The reception unit 11 is configured to acquire from the user terminal a guidance request, which includes intended destination information including at least one destination and image(s) data in which the vehicle is photographed. The user terminal is not particularly limited, but a communication terminal such as a smartphone or a tablet is assumed to be used. The user terminal may be any terminal that meets the requirements. For example, as long as the user terminal can transmit the image data and intended destination information, and can display a response result, the user terminal may be a camera, a music player, a smartwatch, smart glass, or a general-purpose computer having a communication function.

The guidance request received by the reception unit 11 may be acquired by, for example, connecting the user terminal via a web browser to a service site (website) provided by the guidance system 1 on the Internet or a dedicated network, and registering a user input or a photographed image(s).

A part of the functions of the site may be converted into applications (application programs), and the applications may be installed on the user terminal so that the guidance request is notified to the guidance system 1 (reception unit 11). In other words, the guidance system 1 may be configured so as to acquire the guidance request by causing a processor of the user terminal to execute a part of processing via an application installed on the user terminal. The reception unit 11 may be configured so that the intended destination is receivable in a plurality of languages from the user terminal. The reception unit 11 may be configured so that the intended destination is receivable by voice input from the user terminal. The reception unit 11 may include a system for receiving a language setting of the user as required, and displaying or translating into that language. The display or translation based on the set language may be performed on the user terminal side by incorporating a display or translation function into an application for the user terminal.

The guidance request is not always required to include both the intended destination information and the image data at one time. A request including any one of the information/image(s) may be received, and then a request including the other of the information/image(s) may be received. The registered image data may be any one of a still image or a moving image. Similarly, the reception unit 11 is not limited to one file of a still image or a moving image for one guidance request received from the user terminal, and the reception unit 11 may be configured to receive a plurality of pieces of image data. Similarly, the reception unit 11 may be configured to receive both a still image and a moving image for one guidance request. The reception unit 11 may also be configured to automatically acquire, together with the guidance request, departure point information indicating a departure point, current position information indicating a current position, which are input or selected by the user, and current position information acquired by the user terminal from a GPS or the like, in cooperation with the guidance request received from the user terminal.

The reception unit 11 may also be configured such that position information associated with the image data is extracted and used as the current position information.

Figure 2:
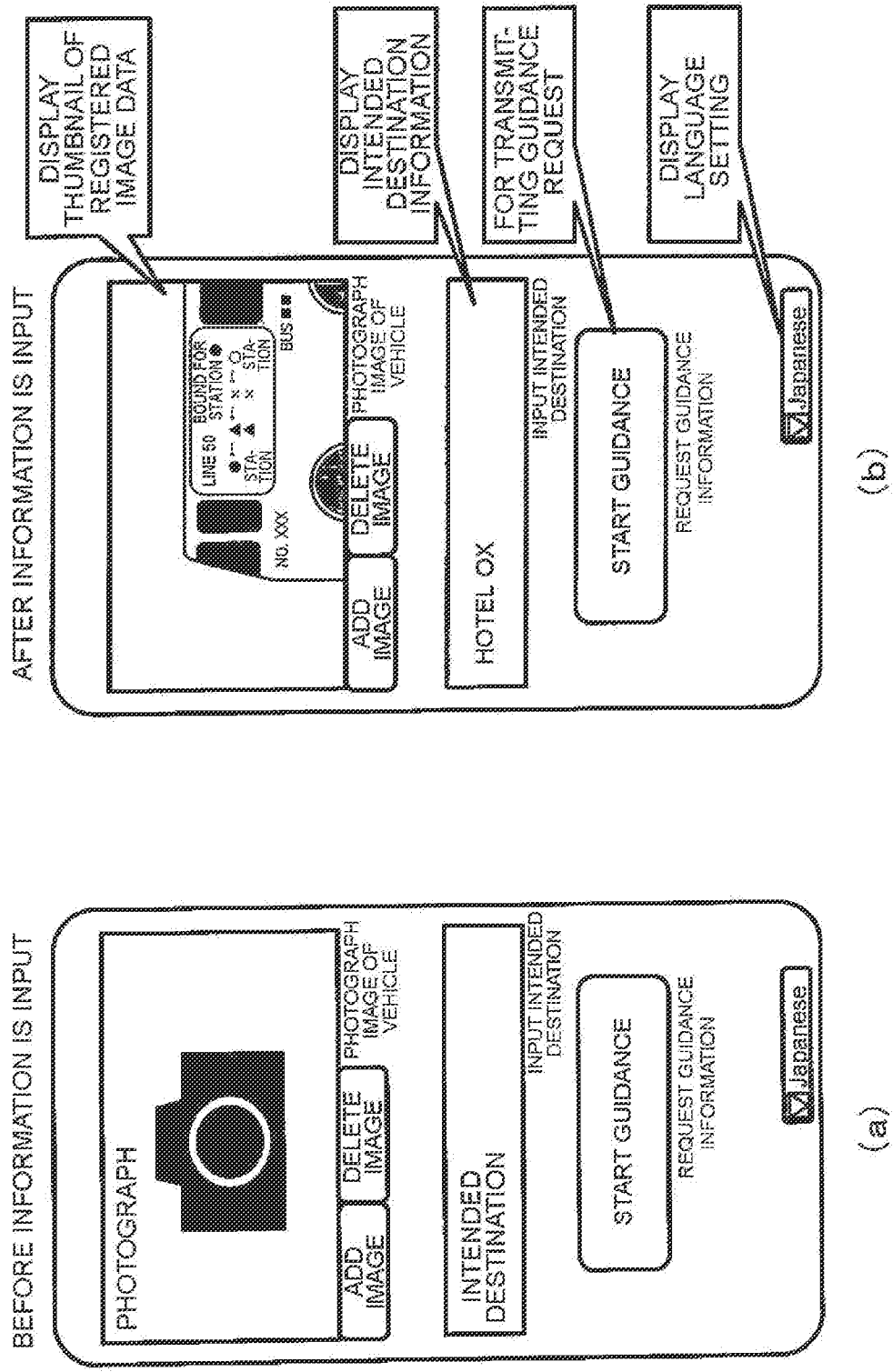
FIG. 2 includes explanatory diagrams for illustrating examples of a user interface transmitting a guidance request to be displayed on a user terminal using the guidance system 1.

An example of a user interface for generating the guidance request on a smartphone is illustrated in FIG. 2. In FIG. 2(*a*), there is illustrated an image before a photograph and an intended destination are input by a touch operation. In FIG. 2(*b*), there is illustrated an image after the photograph and the intended destination are input by a touch operation. The user interface is not limited to this example, and may be created so as to be easy to use while additionally incorporating input fields, for example, departure point information, as required in accordance with the terminal type, browser type, and the like.

The response unit 12 is configured to transmit to the user terminal a response to the guidance request received by the reception unit 11. This response includes various pieces of desired information included in the vehicle-related information collected by the guidance derivation unit 13. This response also includes at least a ride suitability derived by the guidance derivation unit 13. In response to a guidance request that does not include intended destination information, the response unit 12 may transmit content (guidance information) that does not include ride suitability to the user terminal.

The response unit 12 may be formed on a website corresponding to the reception unit 11 or may be configured so as to cause the processor of the user terminal to execute a part of the processing via an application installed on the user terminal.

The response unit 12 notifies the user terminal of the response in accordance with the set language and the request information received from the user as required, and may provide a system for translating and searching route guidance as required. This translation and route guidance may be delegated to an existing translation system or route search engine (program, service) of an external system. The display and route search in the set language and the translation may be performed on the user terminal side by incorporating those functions into an application for the user terminal.

Figure 3:
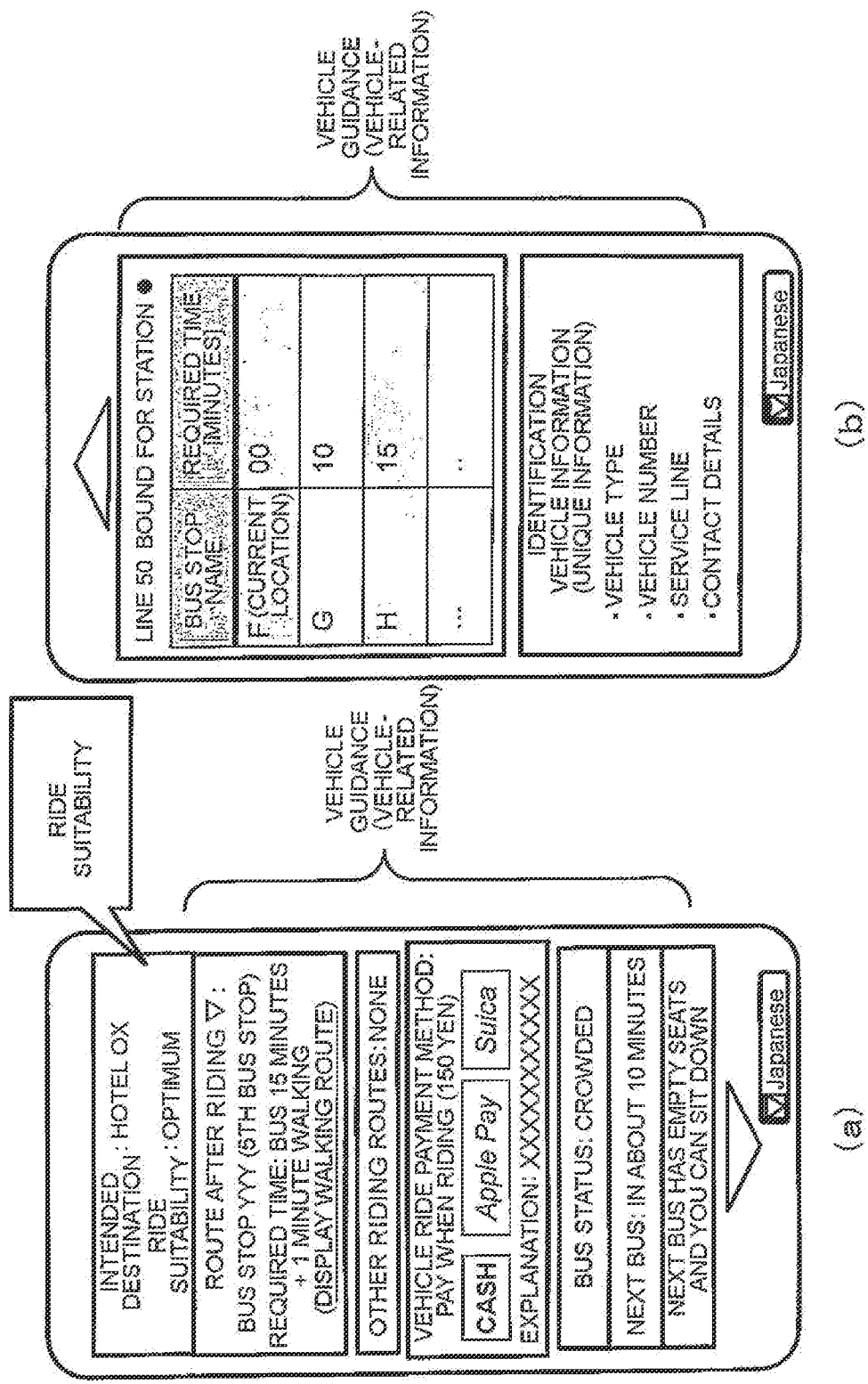
FIG. 3 includes explanatory diagrams for illustrating examples of a user interface displaying a response result to be displayed on the user terminal using the guidance system 1.

An example of display at a time when a response is received by the smartphone is illustrated in FIG. 3. In FIG. 3(*a*), there is illustrated a screen image assuming vehicle guidance based on vehicle-related information together with ride suitability. In FIG. 3(*b*), there is illustrated a screen image of the display screen of a scrolled image or the next page following the image in FIG. 3(*a*).

The guidance derivation unit 13 is configured to receive from the reception unit 11 the image data and the intended destination information included in the guidance request, refer to various databases to perform image recognition on the vehicle information on the vehicle appearing in the image data, and collect vehicle-related information by using that vehicle information as a key. The guidance derivation unit 13 also derives a ride suitability indicating whether or not the vehicle identified by the vehicle-related information is suitable for reaching the intended destination, and notifies the response unit 12 of the ride suitability and the like included in the response. When intended destination information is not received, the guidance derivation unit 13 may refer to the various databases without performing the processing of deriving the ride suitability, collect the vehicle information on the vehicle appearing in the image data and the vehicle-related information, and notify the response unit 12 of the collected vehicle information and vehicle-related information.

The guidance system 1 may use, as the vehicle information to be acquired by image recognition, for example, a vehicle type, a service line, an operating company, a vehicle position, and a vehicle-specific number in combination.

When performing image recognition by using a feature, each piece of vehicle information can be used by preparing, as comparison data for image recognition to be prepared in advance in a database for image recognition, a feature for identifying the vehicle type, a feature for identifying the service line, a feature for identifying the operating company, a feature for identifying the vehicle position, and a feature for identifying the vehicle-specific number. The database for image recognition may also include comparison data of a feature for identifying an individual vehicle. The comparison data for image recognition may be appropriately prepared in accordance with the image recognition technology to be used and the vehicle information to be recognized.

The content of the comparison data for identifying the vehicle type is not limited, and comparison data used for general object recognition of buses, trains, and the like may be used, or comparison data limited to the vehicle of the public transportation means actually operating within the range in which a service is provided may be used. Similarly, the content of the comparison data for identifying the service line is not limited, and, for example, characters on a vehicle electronic board or vehicle paint may be used. For the comparison data for identifying the operating company, for example, characters and marks written on the vehicle body may be used. For the comparison data for identifying the vehicle position, for example, a background building, a boarding building, or a unique number drawn on the boarding building may be used. For the comparison data for identifying the vehicle-specific number, for example, a vehicle number of a train, a vehicle number of a bus, or a bus number plate may be used.

It is desired that each piece of comparison data be identically associated with the actual vehicle of each public transportation means that is actually operated. In this way, for example, when the vehicle type and the service line have been confirmed at an early stage, the comparison data of the vehicle-specific number can be limited to only the corresponding vehicle type and service line. When the current position information is acquired, the comparison data can be narrowed down by using the current position information. For example, in a case in which position information can be referred to when performing image recognition, the guidance system 1 (guidance derivation unit 13) may perform image recognition on the comparison data for image recognition in order of the service lines passing through the surroundings, or by limiting the comparison data for image recognition to the service lines passing through the surroundings.

When the current position information is not acquired, the guidance derivation unit 13 may attempt to acquire position information by image recognition as well. For example, the guidance derivation unit 13 may calculate the position of the vehicle from the image data based on image recognition of the background of the image data. When there is a distinctive building in the background, a sign indicating an alighting location, a landmark, or the like, the guidance derivation unit 13 becomes effective position identifying means.

The guidance derivation unit 13 may be configured to calculate the position of the vehicle from the image data based on image analysis of the image data with respect to the current position information received from the reception unit 11. For example, in the case of a photographed image of a distant vehicle, there may be a difference between the position of the vehicle and the current position information. In such a case, the guidance derivation unit 13 may derive the position of the vehicle from the photography conditions associated with the current position information and the size of the vehicle to be photographed, and collect the derived position as the vehicle-related information.

It is desired that the vehicle information to be acquired by image recognition be used in combination of at least two kinds including the vehicle type. An increase in the accuracy of the image recognition result and the overall response speed can be expected by increasing primary information that can be acquired by image recognition, limiting comparison data to vehicles for which the comparison data actually exists, and narrowing down other comparison data by the recognized vehicle information.

In this way, the guidance derivation unit 13 first acquires vehicle information that is recognized by image recognition. Then, the guidance derivation unit 13 collects vehicle-related information on the vehicle based on the vehicle information obtained by the image recognition result, and derives the ride suitability by referring to the intended destination and places at which getting on or off is possible, such as a station or a bus stop, on the service line included in the vehicle-related information.

The vehicle-related information includes the data itself to be displayed on the user terminal that has received the response, or the data for calculating the information to be displayed to the user. In addition, data to be used in data mining, for example, on the guidance system 1 side may also be included as required. The vehicle-related information includes, for example, the same vehicle type, service line, operating company, and vehicle-specific number as the vehicle information, and additionally includes the current position of the vehicle and the guidance information on the vehicle itself. In the vehicle-related information, various pieces of required information, for example, a route relating to an applicable vehicle, are associated with one another based on various databases with the primary information on the image recognition result serving as a key. Further, in the vehicle-related information, required information from various databases is further associated by using the associated vehicle-related information as secondary information or n-th order information.

The collection of the vehicle-related information based on vehicle information performed by the guidance derivation unit 13, and the collection of further other vehicle-related information based on the vehicle-related information, may be performed by preparing in advance a plurality of kinds of information collection patterns in which the items to be collected are arranged in advance, and selecting and using any one of those information collection patterns for each guidance request.

For example, the guidance derivation unit 13 may select the information collection pattern to be used for the guidance request based on vehicle information recognized by image recognition. As another example, the guidance derivation unit 13 may select the information collection pattern to be used for the guidance request based on vehicle information recognized by image recognition and current position information. As a result, for example, the information collection pattern to be used can be changed depending on whether the vehicle type acquired as the vehicle information is a train or a bus, or whether or not current position information has been acquired.

Through collection of the vehicle-related information based on the selected information collection pattern and the current position information, accurate identification of the vehicle and an improved response speed can be expected.

The guidance system 1 may use, as the vehicle-related information, for example, vehicle timetable data, destination information, an operation status, presence/absence of another route, a fare table, a payment method, a required time, a congestion status, delay information, and position information in a database.

For example, the vehicle-related information may be imported by appropriately accessing the latest information databases sequentially accumulated by the public transportation means. For data that is not changed often such as timetables and fare tables, the data may be accessed by importing those tables into the guidance system 1 in advance. The public transportation means may provide, on a network, a database associating the key vehicle information and vehicle-related information with each other, and the guidance derivation unit 13 may access the database as required.

The guidance derivation unit 13 may also be configured to derive a ride suitability indicating whether or not a vehicle is suitable as a route for reaching an intended destination. Whether or not the vehicle is suitable as a route for reaching the intended destination may be indicated in a relative manner based on whether or not a vehicle identified from the primary information obtained by image recognition from image data is suitable as a route for reaching the intended destination compared with another route. The comparison standard may be suitably determined by using a total traveling time or a walking distance after traveling.

It is desired that the guidance derivation unit 13 be configured to acquire vehicle information on one vehicle from a plurality of pieces of image data by image recognition. Through acquisition of the vehicle information in this way, it becomes possible to identify a vehicle more accurately without an error by increasing the number of input images, such as still images from a plurality of angles of view, or still images and moving images.

When vehicle information (for example, any of vehicle type, service line, operating company, vehicle position, or vehicle-specific number) is not acquired as an image recognition result, the guidance system 1 may transmit to the user an error response or a response requesting the user to transmit an image(s) again.

When the key vehicle information is not obtained from the image data received from the reception unit 11, the guidance system 1 (guidance derivation unit 13) may notify the user terminal of a sample image(s) from which vehicle information can be easily obtained. For example, it is difficult to acquire vehicle information from an image that is too close to the vehicle or an image of a portion that does not have many features. For this reason, it is desired that the guidance system 1 be configured so that a sample(s) of an angle of view (for example, oblique front image, oblique rear image, vehicle electronic board image) as a suggestion to the user can be presented. In this case, it is desired that the guidance system 1 select and notify a sample image(s) suitable for obtaining the vehicle information that is not recognized. For example, when it is desired that the vehicle-specific number be recognized, through presentation to the user of one or more images in which the vehicle-specific number appears, an image suitable for image recognition is more likely to be obtained from the user.

The guidance system 1 (guidance derivation unit 13) may also notify the user terminal of an alternative route when the vehicle recognized by the derived ride suitability is not suitable as a route for reaching the intended destination. The alternative route may be acquired from a route guidance unit arranged in the guidance system 1 or a route guidance system linked to the guidance system 1. The method of acquiring the alternative route is not particularly limited.

Figure 4:
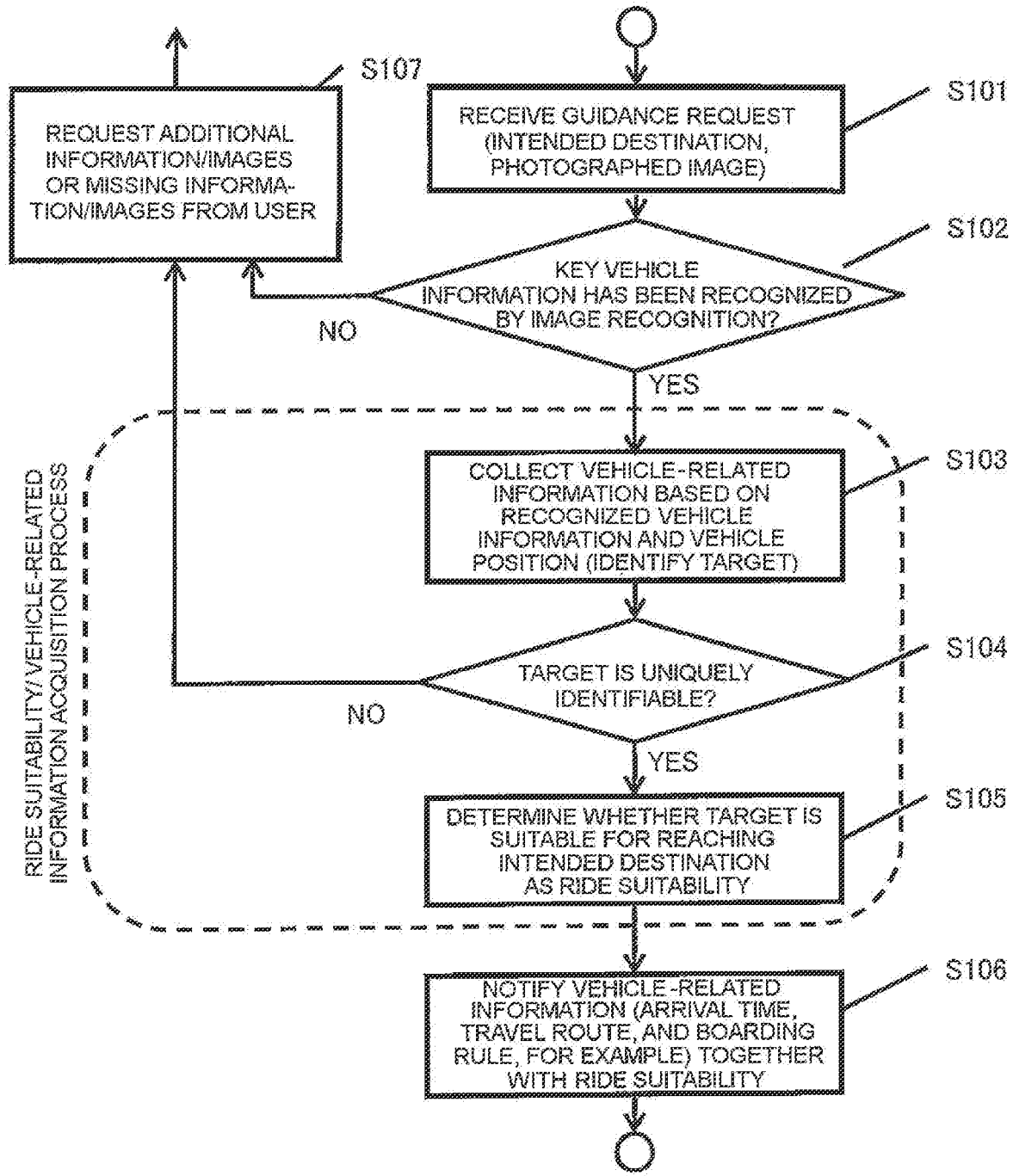
FIG. 4 is a flowchart for illustrating an example of operation relating to a guidance derivation unit 13 of the guidance system 1.

Next, an example of operation relating to the guidance derivation unit 13 is described. FIG. 4 is a flowchart for illustrating the example of operation relating to the guidance derivation unit 13.

First, the guidance derivation unit 13 acquires image data and intended destination information (Step S101). When intended destination information is not received, the guidance derivation unit 13 may perform the following operation so as to skip Step S105 for deriving the ride suitability.

Next, the guidance derivation unit 13 performs image recognition on vehicle information appearing in the acquired image data (Step S102). When vehicle information is not recognized by image recognition, the guidance derivation unit 13 transmits an inquiry to the user about additional information/images or missing information/images (Step S107).

In this image recognition, at least one or more pieces of the vehicle information to be recognized are recognized from image data in which a bus or a train appears. When there is a sufficient amount of comparison data, for example, not only the common name (vehicle type) can be acquired by just image recognition, but the service line, the operating company, the vehicle position, and the vehicle-specific number can also be acquired by referring to the vehicle body pattern, vehicle body shape, features, and the like.

Next, the guidance derivation unit 13 collects, based on the vehicle information recognized by image recognition, vehicle-related information on the vehicle for which a guidance request has been performed (Step S103). When collecting this vehicle-related information, the guidance derivation unit 13 reads an information collection pattern selected based on the vehicle information recognized from an information collection pattern table (information collection pattern list) similar to that shown in FIG. 5, and also identifies and collects the various pieces of information to be collected by using the current position information.

The guidance derivation unit 13 manages the collected vehicle-related information for each guidance request in a guidance request/vehicle-related information table similar to that shown in FIG. 6. The guidance derivation unit 13 notifies the response unit 12 of the vehicle-related information collected for each guidance request. The notification of vehicle-related information to the response unit 12 is not particularly limited, and may be performed by collectively notifying items or by notifying each item.

When the vehicle-related information is collected and the vehicle can be identified, the guidance derivation unit 13 advances the processing to the next step (Step S104), and when the vehicle-related information is collected but the vehicle is not identified, the guidance derivation unit 13 transmits an inquiry to the user about additional information/images or missing information/images (Step S107). The vehicle-related information in this case is information that can be used to uniquely identify a target by using recognized vehicle information, information derived from vehicle information, or information further derived using derived information. In many cases, for each individual vehicle, an object can be uniquely identified based on a feature such as the shape, pattern, or color of the vehicle, and position information on the vehicle. The current position information on the vehicle may be acquired in any manner, and the acquisition method is not particularly limited. For example, the current position information on the vehicle may use the photography position coordinates of the image data. When the image data does not have position coordinates, acquisition of position information on the user terminal may be requested separately.

The various databases for acquiring vehicle-related information are not particularly limited, and the vehicle-related information in a table format as exemplified in FIG. 7 to FIG. 9 may be accessed, or vehicle-related information in another type of format may be accessed. Further, the position of the database is not particularly limited, and may be a mixture of inside and outside the system. The various databases are not limited to those shown as examples, and databases that provide accurate and the latest information may be used. For example, a database linking event names and event venues, a database showing intended destinations and alighting locations in each language, a database providing a delay status, a database providing a degree of crowdedness of each vehicle of a train, a database providing the degree of crowdedness and an estimated arrival time of the next bus, and the like may be arranged in a referable manner. It is also desired that the databases be configured so that the content of the databases is not fixed and new content can be added as appropriate.

Next, the guidance derivation unit 13 refers to the vehicle-related information and the intended destination information, and determines whether or not the vehicle is suitable for reaching the intended destination, that is, ride suitability (Step S105). This ride suitability may be determined by referring to, for example, whether or not the vehicle is preferentially used as a route to the intended destination by route guidance. For this ride suitability, even when the vehicle is not preferentially used as a route to the intended destination, whether or not the vehicle is to arrive at the intended destination may also be used as a determination standard. Information indicating a degree of suitability for reaching the intended destination may be provided to the user. The information indicating the degree of suitability for reaching the intended destination may be obtained by receiving one or more registrations of items such as time priority/fare priority/easy-to-understand priority from the user, and deriving the degree of suitability in accordance with those priority matters and a priority order.

Lastly, the guidance derivation unit 13 notifies the response unit 12 of the information on the determined ride suitability and any vehicle-related information, such as an arrival time, a travel route, and a boarding rule, that has not been notified (Step S106). In place of a mode of notifying the response unit 12, the vehicle-related information may be delivered by a mode in which the response unit 12 refers to the guidance request/vehicle-related information table shown in FIG. 6.

Then, the response unit 12 transmits to the user terminal a response including at least the ride suitability in response to the guidance request received by the reception unit 11.

The user terminal that has received this response can present to the user useful ride suitability information that assists the user in determining whether he or she can go to the intended destination by boarding or riding the photographed vehicle. In other words, the guidance system 1 can provide information on ride suitability to the user.

Description of Operation of Embodiment

There is now described an example of a ride guidance method of the guidance system 1 for the user terminal.

Figure 10:
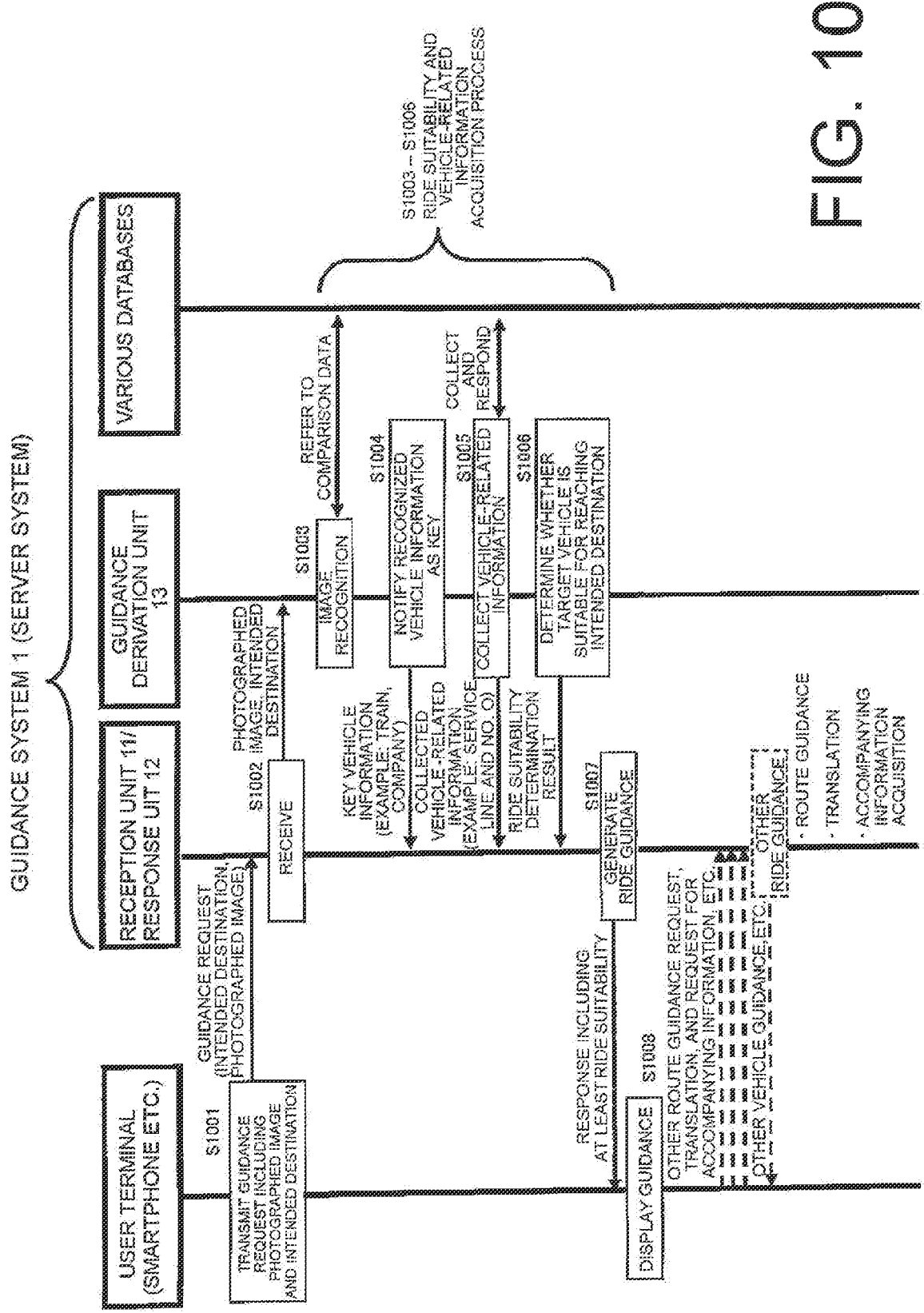
FIG. 10 is a sequence diagram for illustrating an exemplary operation of the guidance system 1.

FIG. 10 is a sequence diagram for illustrating an example of operation relating to the guidance system 1. The guidance system 1 sequentially collects and sequentially updates, in an internal database, the latest and detailed information (service line diagrams, timetables, operation information, crowdedness status, for example) of each transportation means as comparison data for image recognition and vehicle-related information. The intended destination information registered in the database includes, in addition to a getting on and off position, such as a station name and bus stop name, a hotel name, a sightseeing spot, an event (venue) name, and the like in advance. Each piece of intended destination information is registered in as many languages as possible, and a unique identifier is given to each intended destination. In the case of an intended destination input in an unregistered language or an address specified in a foreign language, the intended destination or address is translated into Japanese and used by the guidance system 1.

The user terminal is now described by assuming a common smartphone having a photographing unit (camera function), an input unit (touch interface), and a positioning unit (GPS function). It is also assumed that in the user terminal, a function of adding position information to the image data at the time of photographing using the camera function is set to "on".

An application program for guidance system 1 is installed in the user terminal, and the simple user interface illustrated in FIG. 2 for transmitting a guidance request is provided to the user. The application program is introduced and used as an application for assisting foreign tourists and event users, for example, to use public transportation means and shuttle buses. This application program is created so that each item and description can be displayed in each language.

First, during a preparation process by the user, the application program for the guidance system 1 is installed on the smartphone to be used, and the language is set.

When the user goes to the intended destination (in this example, "hotel OX"), he or she operates the smartphone to start the guidance application, and inputs "hotel OX" (intended destination information) in his or her own language. The user then takes a photograph (image data) of a public bus (vehicle) in front of the user, and taps (transmits) guidance start (guidance request to guidance system 1). At this time, the user terminal (smartphone) transmits to the guidance system 1 (reception unit 11) a guidance request including the image data to which position information is attached and the intended destination information converted into Japanese or a unique ID of the intended destination information via a communication network (Step S1001).

The guidance system 1 (reception unit 11) receives the guidance request transmitted from the user terminal, and notifies the image data and intended destination information included in the guidance request to the guidance derivation unit (Step S1002).

The guidance system 1 (guidance derivation unit 13) receives the received image data and intended destination information, refers to the comparison data in the database, and performs image recognition on one or more pieces of vehicle information in the image data (Step S1003). Vehicle-related information is collected using the recognized vehicle information as a key, and the vehicle-related information is notified to the response unit 12 (Step S1004). The vehicle-related information at this point includes the recognized vehicle type and service line information.

Next, the guidance system 1 (guidance derivation unit 13) compares the vehicle-related information (vehicle type and service lines information, for example) acquired by image recognition, position information for each vehicle traveling on the same service line in the database, and the position information added to the image data, and the like, and identifies the vehicle photographed by the user from the vehicles traveling on the identified service line. At the same time, the guidance derivation unit 13 acquires from the database related information to be included in the response, and notifies the vehicle-related information to the response unit 12 (Step S1005). The response unit 12 may be configured to acquire the related information to be used in the response by referring to a database.

Next, the guidance system 1 (guidance derivation unit 13) determines a ride suitability indicating whether or not the vehicle is suitable for reaching the intended destination by referring to the confirmed vehicle-related information and intended destination information, and the determined ride suitability is notified to the response unit 12 (Step S1006).

Next, the guidance system 1 (response unit 12) notifies, as a response to the guidance request, the user terminal of the collected related information together with the ride suitability determination result indicating whether or not the photographed vehicle is suitable for reaching the intended destination (Step S1006).

When this response is received, the user terminal displays on the screen the ride suitability and the vehicle guidance (vehicle-related information) illustrated in FIG. 3 in the set language (Step S1007).

The user can obtain information in his or her own language, which can be used to easily determine whether or not a vehicle right in front of the user is suitable for reaching the intended destination. In addition, many items related to the vehicle right in front of the user can be obtained simultaneously by referring to the vehicle guidance. As a result, some factors that the user may be anxious about when using the vehicle can be solved, to thereby reduce anxiety.

In the user interface illustrated in FIG. 2 and FIG. 3, various pieces of information, such as the fact that the user can go to the vicinity of an intended destination by riding the bus right in front of the user, the fact that this bus is better than other vehicle means, the route after riding, and the payment method for fare, can be obtained by inputting the intended destination, taking a photograph, and transmitting a guidance request.

For this reason, for example, even when there is no guidance display in their own language, foreign tourists can obtain information for determining whether it is appropriate to ride a bus that has stopped at a bus stop right in front of the user, which reduces anxiety. Such determination information is not provided by existing route guidance applications that provide route guidance until the bus stop.

As described above, according to the embodiment of this invention, it is possible to provide a guidance system that can reduce some of the anxiety factors of a user using vehicle.

Figure 11:
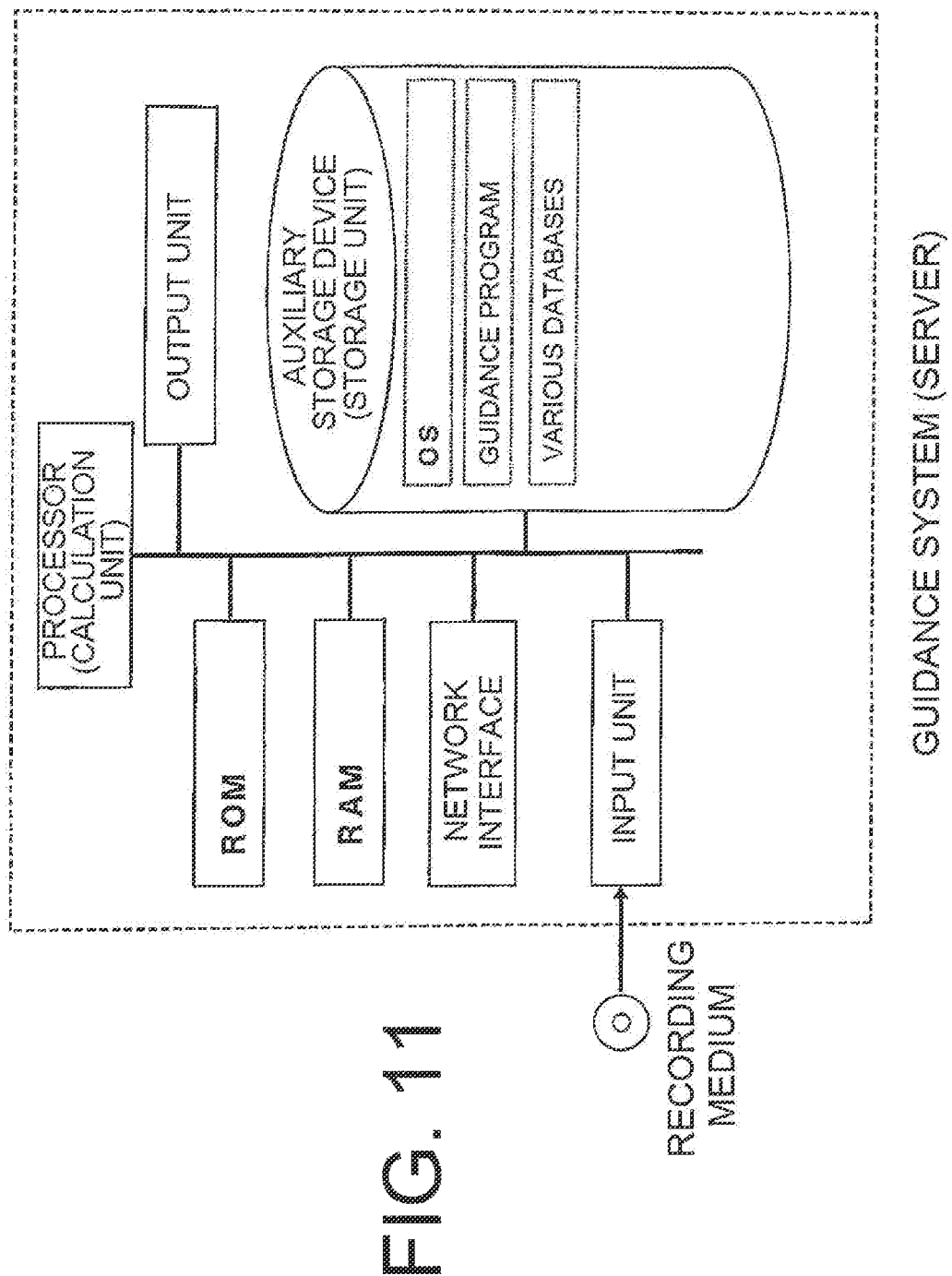
FIG. 11 is a block diagram for illustrating an exemplary configuration of the guidance system 1 according to an embodiment of this invention.
Figure 12:
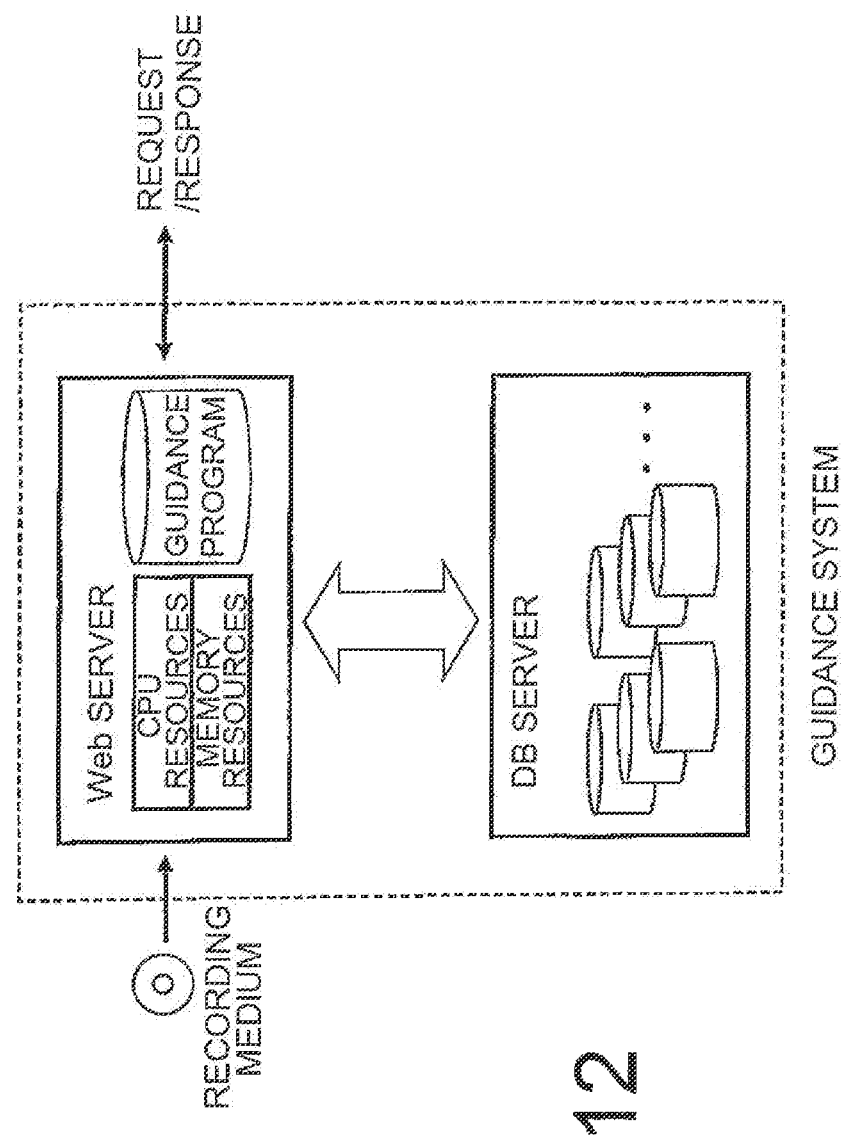
FIG. 12 is a block diagram for illustrating another exemplary configuration of the guidance system 1 according to an embodiment of this invention.

Each part of the guidance system may be implemented by appropriately using a combination of the hardware and software of a computer system (server system) and virtualization technology, as illustrated in FIG. 11 and FIG. 12. The computer system includes one or more processors and memories adjusted to the desired mode. In this computer system mode, each part may be implemented by a guidance system program loaded in the memory, in which hardware, for example, one or more processors is operated by an execution instruction group or a code group based on the program. In this case, the program may implement each part in cooperation with functions provided by software, such as an operating system, a microprogram, and a driver, as required.

The program data loaded in the memory includes, as appropriate, an execution instruction group, a code group, a table file, content data, and the like that cause the processor to operate as one or more of the above-mentioned units.

The units of a part or all of the computer system may be replaced with hardware or firmware (for example, one or more of large-scale integration (LSI), field programmable gate array (FPGA), and a combination of electronic elements). Similarly, only a part of each unit may be replaced with hardware or firmware.

The program may be recorded in a non-transitory manner on a recording medium and distributed. The program recorded on the recording medium is read into the memory via wired connection, wireless connection, or the recording medium itself, and operates the processor and the like.

In this specification, the term "recording medium" includes similarly-termed storage media, memory devices, storage devices, and the like. Examples of the recording medium include an optical disc, a magnetic disk, a semiconductor memory device, a hard disk device, and a tape medium. It is desired that the recording medium be non-volatile. The recording medium may be a combination of a volatile module (for example, random access memory (RAM)) and a non-volatile module (for example, read only memory (ROM)).

When the above-mentioned mode is described in another way, a guidance system is implemented by causing a server system configured to operate as a guidance system to operate as a reception unit, a guidance unit, a response unit, and the like based on the above-mentioned program (group) loaded in the memory.

The embodiment of this invention is described as an example. However, specific configurations of this invention are not limited to the above-mentioned embodiment, and changes that do not depart from the gist of this invention are also included in this invention. For example, in the embodiment described above, changes such as separation and merging of the block components and a switch of processing steps can be freely carried out as long as the purport and the above-mentioned functions of this invention are satisfied, and the above-mentioned description does not limit this invention.

Further, part or whole of the above-mentioned embodiment can also be described as follows. Note that, the following notes are not intended to limit this invention.

[Supplementary Note 1]

A guidance system, comprising:

a reception unit configured to acquire from a user terminal a guidance request including at least an intended destination and image data;

a guidance unit configured to acquire, based on vehicle information on a vehicle recognized from the image data by image recognition, vehicle-related information on the vehicle and to derive a ride suitability indicating whether or not the vehicle is suitable for reaching the intended destination by referring to the vehicle-related information and the intended destination; and a response unit configured to notify the user terminal of a response including at least the ride suitability derived by the guidance unit.

[Supplementary Note 2]

The guidance system according to Supplementary Note 1, wherein the guidance unit is configured to derive, when referring to the vehicle-related information and the intended destination to derive the ride suitability, a ride suitability indicating whether or not the vehicle is suitable as a route for reaching the intended destination compared with another route.

[Supplementary Note 3]

The guidance system according to Supplementary Note 1 or 2, wherein the reception unit is configured to receive a plurality of pieces of image data for one guidance request received from the user terminal, and wherein the guidance unit is configured to acquire vehicle information on one vehicle from the plurality of pieces of image data by image recognition.

[Supplementary Note 4]

The guidance system according to any one of Supplementary Notes 1 to 3, wherein, when vehicle information is not recognized from the image data received from the reception unit, the guidance unit notifies the user terminal of a sample image indicating a sample of an image from which vehicle information is recognizable.

[Supplementary Note 5]

The guidance system according to any one of Supplementary Notes 1 to 3, wherein the guidance unit is configured to refers to a database in which vehicle information provided by public transportation means and the vehicle-related information are associated with each other, to thereby acquire the vehicle-related information based on the vehicle information as a key.

[Supplementary Note 6]

The guidance system according to any one of Supplementary Notes 1 to 3, wherein the guidance unit is configured to select, based on the vehicle information recognized by the image recognition, an information collection pattern in which items to be collected for a guidance request have been arranged in advance, and collect, based on the selected information collection pattern and current position information, the vehicle-related information on the vehicle.

[Supplementary Note 7]

The guidance system according to any one of Supplementary Notes 1 to 6, wherein, when a final granularity for uniquely discriminating a photographed vehicle is not recognized by the image recognition performed on the image data by template matching, the guidance unit acquires, as the image recognition result, at least one of a vehicle type, a service line, an operating company, a vehicle position, or a vehicle-specific number, collects the vehicle-related information on the vehicle based on the image recognition result, and derives the ride suitability indicating whether or not the vehicle is suitable for reaching the intended destination by referring to the vehicle-related information and the intended destination.

[Supplementary Note 8]

The guidance system according to any one of Supplementary Notes 1 to 7, wherein the reception unit is configured so that the intended destination is receivable in a plurality of languages from the user terminal, and wherein the response unit is configured to notify information included in a response in a language set by a user.

[Supplementary Note 9]

A guidance method to be performed by an information processing system, the guidance method comprising:

receiving, from a user terminal, a guidance request including at least an intended destination and image data;

performing image recognition on vehicle information on a vehicle appearing in the image data, and acquiring vehicle-related information on the vehicle based on the vehicle information recognized by image recognition;

deriving a ride suitability indicating whether or not the vehicle is suitable for reaching the intended destination by referring to the vehicle-related information and the intended destination; and notifying the user terminal of a response including at least the derived ride suitability.

[Supplementary Note 10]

A guidance program for causing a server system to operate as:

a reception unit configured to acquire from a user terminal a guidance request including at least an intended destination and image data;

a guidance unit configured to acquire, based on vehicle information on a vehicle recognized from the image data by image recognition, vehicle-related information on the vehicle and to derive a ride suitability indicating whether or not the vehicle is suitable for reaching the intended destination by referring to the vehicle-related information and the intended destination; and a response unit configured to notify the user terminal of a response including at least the ride suitability derived by the guidance unit.

[Supplementary Note 11]

A computer-readable non-transitory recording medium having recorded thereon a guidance program, the recording medium being configured to cause at least one processor to operate, based on the guidance program loaded in a memory of a server system, as:

a reception unit configured to acquire from a user terminal a guidance request including at least an intended destination and image data via a communication network;

a guidance unit configured to: acquire vehicle information by performing image recognition on the image data received by the reception unit; acquire, based on the acquired vehicle information, vehicle-related information on the vehicle from a database; and derive a ride suitability indicating whether or not the vehicle is suitable for reaching the intended destination by referring to the vehicle-related information and the intended destination included in the guidance request; and a response unit configured to notify, via the communication network, the user terminal of a response including at least the ride suitability derived by the guidance unit.

In the above-mentioned description of this invention, the guidance system is described as being linked to an existing route guidance system. However, it is also possible for the guidance system and the route guidance system to be integrated. In this case, for example, a camera icon or the like may be added on a request input screen of the existing route guidance system, and the ride suitability may be displayed on a guidance result screen.

This application is based upon and claims the benefit of priority from Japanese patent application No. 2017-087305, filed on Apr. 26, 2017, the disclosure of which is incorporated herein in its entirety by reference.

REFERENCE SIGNS LIST 1 guidance system
11 reception unit
12 response unit
13 guidance derivation unit

The invention claimed is:

1. A server system to operate a guidance system, the server system comprising a processor configured to:

acquire from a user terminal via a communication network a guidance request including at least an intended destination and image data of at least some photographed vehicle;

recognize vehicle information as key information the vehicle from the image data by image recognition with template matching;

collect from information databases vehicle-related information on the vehicle based on the vehicle information as the key information;

derive a ride suitability indicating whether or not the vehicle is suitable for reaching the intended destination by referring to the vehicle-related information and the intended destination; and notify via the communication network the user terminal of a response including at least the ride suitability derived, wherein the processor is further configured to:

acquire, as a result of the image recognition, the key information comprising at least two of a vehicle type corresponding to a mode of transportation, a service line, an operating company a vehicle position, and a vehicle-specific number, and collect from the information databases the vehicle-related information on the vehicle based on the result of the image recognition comprising the at least two of a vehicle type corresponding to a mode of transportation, a service line, an operating company, a vehicle position, and a vehicle-specific number in combination as the key information, and when the vehicle information as the key information is not recognized from the image data by the image recognition, select, based on the vehicle information as the key information that is not recognized, one or more images as a sample image indicating a sample of an image of the vehicle information as the key information, and notify the one or more images to the user terminal via the communication network.

2. The server system according to claim 1, wherein the processor is configured to derive, when referring to the vehicle-related information and the intended destination to derive the ride suitability, a ride suitability indicating whether or not the vehicle is suitable as a route for reaching the intended destination compared with another route.

3. The server system according to claim 1, wherein the processor is configured to receive a plurality of pieces of image data for one guidance request as the guidance request received from the user terminal via the communication network, and wherein the processor is configured to acquire the vehicle information on one vehicle based on the plurality of pieces of image data by the image recognition.

4. The server system according to claim 3, wherein the processor is configured to:

receive a still image and/or a moving image as the plurality of pieces of the image data for the one guidance request received from the user terminal via the communication network, and acquire the vehicle information on one vehicle based on at least one moving image by the image recognition.

5. The server system according to claim 1, wherein the processor is configured to refer to a database in which the vehicle information provided by public transportation and the vehicle-related information are associated with each other, to thereby acquire the vehicle-related information based on the vehicle information as the key information.

6. The server system according to claim 1,
wherein the server system has in advance a plurality of information collection patterns in each of which items to be collected on recognized vehicle information are arranged in advance, and
wherein the processor is configured to select for the guidance request, based on the vehicle information recognized by the image recognition, an information collection pattern from the plurality of information collection patterns, and collect, based on the selected information collection pattern, the vehicle-related information on the vehicle.

7. The server system according to claim 1, wherein, when the vehicle is not uniquely discriminated by the image recognition performed on the image data by template matching, the processor acquires, as the result of the image recognition, the key information comprising at the least two of the vehicle type corresponding to the mode of transportation, the service line, the operating company, the vehicle position, and the vehicle-specific number, collects from the information databases the vehicle-related information on the vehicle based on the result of the image recognition comprising the at least two of a vehicle type corresponding to a mode of transportation, a service line, an operating company, a vehicle position, and a vehicle-specific number in combination as the key information, recognizes uniquely the vehicle by the collected information, and derives the ride suitability indicating whether or not the vehicle is suitable for reaching the intended destination by referring to the vehicle-related information and the intended destination.

8. The server system according to claim 1,
wherein the processor is configured so that the intended destination is receivable in a plurality of languages from the user terminal via the communication network, and
wherein the processor is configured to notify information included in the response in a language set by a user.

9. A guidance method to be performed by an information processing system including a processor, the guidance method comprising:
receiving, from a user terminal via a communication network, a guidance request including at least an intended destination and image data of at least some photographed vehicle;
performing image recognition on vehicle information as key information on the vehicle appearing in the image data, and collecting from information databases vehicle-related information on the vehicle based on the vehicle information as the key information recognized by the image recognition with template matching;
deriving a ride suitability indicating whether or not the vehicle is suitable for reaching the intended destination by referring to the vehicle-related information and the intended destination; and
notifying via the communication network the user terminal of a response including at least the derived ride suitability,
wherein the method is thither configured to:
acquiring, as a result of the image recognition, the key information comprising at least two of a vehicle type corresponding to a mode of transportation, a service line, an operating company, a vehicle position, and a vehicle-specific number, and collecting from the information databases the vehicle-related information on the vehicle based on the result of the image recognition comprising the at least two of a vehicle type corresponding to a mode of transportation, a service line, an operating company, a vehicle position, and a vehicle-specific number in combination as the key information, and
when the vehicle information as the key information is not recognized from the image data by the image recognition, selecting, based on the vehicle information as the key information that is not recognized, one or more images as a sample image indicating a sample of an image of suitable for the vehicle information as the key information, and notifying the one or more images to the user terminal via the communication network.

10. The guidance method according to claim 9, wherein when referring to the vehicle-related information and the intended destination to derive the ride suitability, the processor derives a ride suitability indicating whether or not the vehicle is suitable as a route for reaching the intended destination compared with another route.

11. The guidance method according to claim 9,
wherein the processor receives a plurality of pieces of image data for one guidance request as the guidance request received from the user terminal via the communication network, and
wherein the processor acquires the vehicle information on one vehicle based on the plurality of pieces of image data by the image recognition.

12. The guidance method according to claim 9, wherein the processor refers to a database in which the vehicle information provided by public transportation and the vehicle-related information are associated with each other, to thereby acquire the vehicle-related information based on the vehicle information as the key information.

13. The guidance method according to claim 9,
wherein the information processing system has in advance a plurality of information collection patterns in each of which items to be collected on recognized vehicle information are arranged in advance, and
wherein the processor selects for the guidance request, based on the vehicle information recognized by the image recognition, an information collection pattern from the plurality of information collection patterns, and collect, based on the selected information collection pattern, the vehicle-related information on the vehicle.

14. The guidance method according to claim 9, wherein when the vehicle is not uniquely discriminated by the image recognition performed on the image data by template matching, the processor acquires, as the result of the image recognition, the key information comprising at the least two of the vehicle type corresponding to the mode of transportation, the service line, the operating company, the vehicle position, and the vehicle-specific number, collects from the information databases the vehicle-related information on the vehicle based on the result of the image recognition comprising the at least two of a vehicle type corresponding to a mode of transportation, a service line, an operating company, a vehicle position, and a vehicle-specific number in combination as the key information, recognizes uniquely the vehicle by the collected information, and derives the ride suitability indicating whether or not the vehicle is suitable for reaching the intended destination by referring to the vehicle-related information and the intended destination.

15. A computer-readable non-transitory recording medium having recorded thereon a program for causing a processor of a server system to:
- acquire from a user terminal via a communication network a guidance request including at least an intended destination and image data of at least some photographed vehicle;
- recognize vehicle information on the vehicle from the image data by image recognition with template matching;
- collect vehicle-related information on the vehicle from information databases based on the vehicle information;
- derive a ride suitability indicating whether or not the vehicle is suitable for reaching the intended destination by referring to the vehicle-related information and the intended destination; and
- notify via the communication network the user terminal of a response including at least the ride suitability derived,
- wherein the program further causing the processor of the server system to:
  - acquire, as a result of the image recognition, the key information comprising at least two of a vehicle type corresponding to a mode of transportation, a service line, an operating company, a vehicle position, and a vehicle-specific number, and collect from the information databases the vehicle-related information on the vehicle based on the result of the image recognition comprising the at least two of a vehicle type corresponding to a mode of transportation, a service line, an operating company, a vehicle position, and a vehicle-specific number in combination as the key information, and
  - when the vehicle information as the key information is not recognized from the image data by the image recognition, select, based on the vehicle information as the key information that is not recognized, one or more images as a sample image indicating a sample of an image of the vehicle information as the key information, and notify the one or more images to the user terminal via the communication network.

16. The computer-readable non-transitory recording medium according to claim 15, wherein when referring to the vehicle-related information and the intended destination to derive the ride suitability, the program causes the processor to derive a ride suitability indicating whether or not the vehicle is suitable as a route for reaching the intended destination compared with another route.

17. The computer-readable non-transitory recording medium according to claim 15,
- wherein the program causes the processor to receive a plurality of pieces of image data for one guidance request as the guidance request received from the user terminal via the communication network, and
- wherein the program causes the processor to acquire the vehicle information on one vehicle based on the plurality of pieces of image data by the image recognition.

18. The computer-readable non-transitory recording medium according to claim 15, wherein the program causes the processor to refer to a database in which the vehicle information provided by public transportation and the vehicle-related information are associated with each other, to thereby acquire the vehicle-related information based on the vehicle information as the key information.

19. The computer-readable non-transitory recording medium according to claim 15,
- wherein the server system has in advance a plurality of information collection patterns in each of which items to be collected on recognized vehicle information are arranged in advance, and
- wherein the program causes the processor to select for the guidance request, based on the vehicle information recognized by the image recognition, an information collection pattern from the plurality of information collection patterns, and collect, based on the selected information collection pattern, the vehicle-related information on the vehicle.

20. The computer-readable non-transitory recording medium according to claim 15,
- wherein when the vehicle is not uniquely discriminated by the image recognition performed on the image data by template matching, the program causes the processor to acquire, as the result of the image recognition, the key information comprising at the least two of the vehicle type corresponding to the mode of transportation, the service line, the operating company, the vehicle position, and the vehicle-specific number, collect from the information databases the vehicle-related information on the vehicle based on the result of the image recognition comprising the at least two of a vehicle type corresponding to a mode of transportation, a service line, an operating company, a vehicle position, and a vehicle-specific number in combination as the key information, recognize uniquely the vehicle by the collected information, and derive the ride suitability indicating whether or not the vehicle is suitable for reaching the intended destination by referring to the vehicle-related information and the intended destination.

* * * * *